J. D. TRUSS.
Harness-Attachments.
No. 157,248. Patented Nov. 24, 1874.
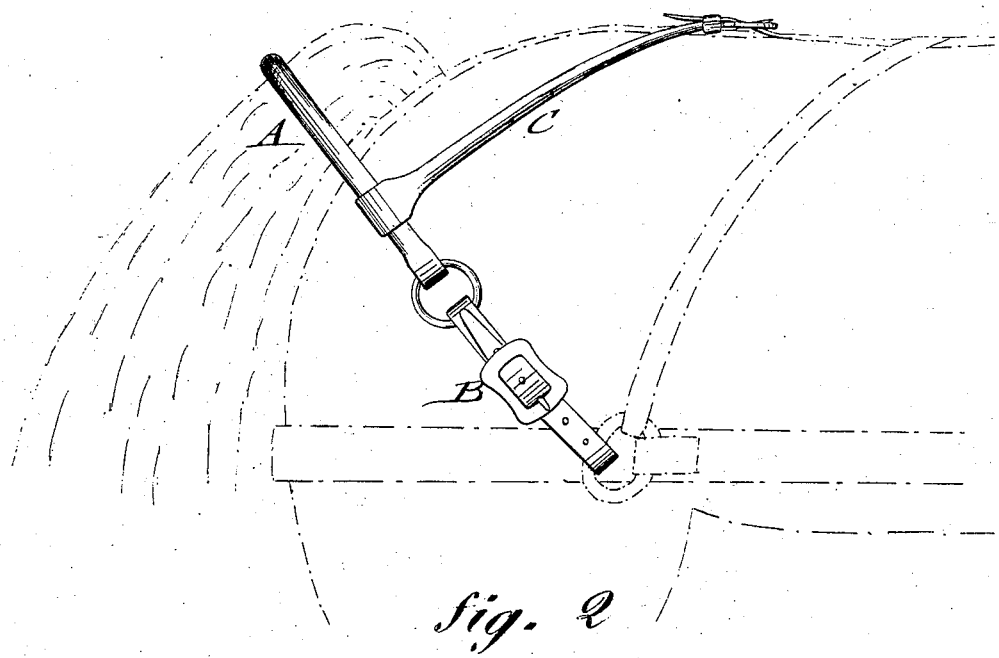
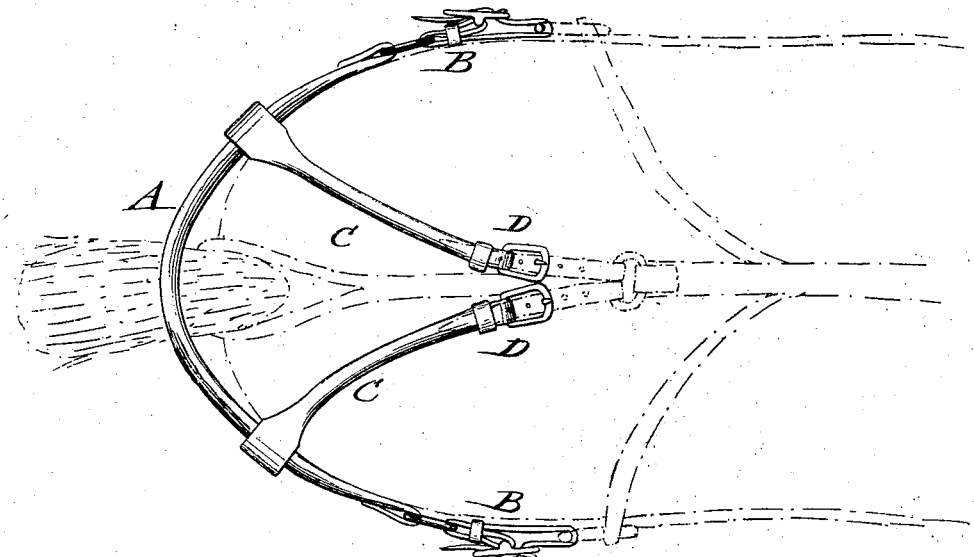
WITNESSES:
INVENTOR:
ATTORNEYS.

UNITED STATES PATENT OFFICE.

JAMES D. TRUSS, OF FERRYVILLE, ALABAMA.

IMPROVEMENT IN HARNESS ATTACHMENTS.

Specification forming part of Letters Patent No. 157,248, dated November 24, 1874; application filed October 17, 1874.

*To all whom it may concern:*

Be it known that I, JAMES D. TRUSS, of Ferryville, St. Clair county, Alabama, have invented a new and Improved Harness Attachment, of which the following is a specification:

In the accompanying drawing, Figure 1 represents a side view of my improved harness attachment, and Fig. 2 a top view of the same.

Similar letters of reference indicate corresponding parts.

The object of my invention is to furnish, for buggy and other harness, a simple and effective attachment, by which the horse is prevented from throwing his tail over the lines, while it gives him at the same time the proper use of his tail.

My invention consists of a round and stiffened strap, which passes over the outer part of the tail, and is buckled, by end straps, to the breeching-stays, being also connected, by stays at both ends of the tail, to the back-strap, for securing exact and steady position of the tail-strap.

In the drawing, A represents a round strap, which is stiffened by an exterior wire, or otherwise, and placed over the tail of the horse at some distance from the root of the same. The ends of the strap A are buckled, by straps B, to the rings of the breeching-stays, and thereby the round strap stretched over the outer part of the tail, so as to press tightly thereon, controlling the motion of the tail and guarding off the lines from the same. Additional stays C, of rounded shape, with central stiffening-wire, are attached at both sides of the tail to the main strap A, and, by means of buckles D at the opposite ends, to the back-strap, to which the crupper is also connected. The stays C retain the main strap in the required position on the tail, so that the lines cannot get entangled by the tail, while the free use of the same is not restricted, nor any pressure exerted by the strap thereon.

This simple arrangement prevents, therefore, the annoyance arising from the horse throwing his tail over the lines, and improves buggy and wagon harness in an important point.

Having thus described my invention, I claim as new and desire to secure by Letters Patent—

The tail-guard strap passing from one breeching-ring to the other, and supported by straps C C attached to the back-strap, as and for the purpose specified.

JAMES D. TRUSS.

Witnesses:
HUBBARD H. STRANGE,
J. R. ROBERSON.